Patented Jan. 31, 1950

2,496,091

UNITED STATES PATENT OFFICE 2,496,091

METHOD FOR THE PREPARATION OF PHENYL CHLOROFORMATE

John A. S. Hammond, Glenbrook, Conn., assignor to U. S. Industrial Chemicals, Inc., New York, N. Y., a corporation of Delaware No Drawing. Application April 26, 1947, Serial No. 744,159

5 Claims. (Cl. 260—463)

This invention relates to a method for the preparation of phenyl chloroformate, a compound which is represented by the formula $(C_6H_5O)COCl$.

This material is useful as an intermediate in the manufacture of urethanes and other chemical compounds.

The following example illustrates in detail one embodiment of the method of the present invention for the preparation of phenyl chloroformate.

Example

To a mixture containing 188 gms. (2 mols) of phenol and 80 gms. (2 mols) of sodium hydroxide in 110 ml. of water there was added 600 ml. of toluene, and the mixture was thereafter distilled. The vapors (composed of a binary mixture of toluene and water) were condensed, separated into two layers, the aqueous layer discarded, and the toluene layer returned to the distillation flask. In this manner substantially all of the water was removed, leaving a substantially anhydrous slurry of sodium phenolate and toluene.

212 gms. (slightly over 2 mols) of anhydrous phosgene was dissolved in 250 ml. of toluene, and to this stirred solution was slowly added the sodium phenolate-toluene slurry over a period of about one-half hour. During the addition of the slurry the temperature of the reaction mixture was held at about minus 10° C., and after all the slurry had been added the reaction mixture was stirred for an additional two hours while it was maintained at the aforementioned temperature. The mixture was thereafter filtered to remove the precipitated sodium chloride, and the filtrate was vacuum-rectified to remove the toluene. After all the toluene had distilled off, the phenyl chloroformate distilled at about 65° C. under an absolute pressure of 10 mm. of mercury.

Various modifications may be made in the procedure of the example for the preparation of phenyl chloroformate in high yield and excellent purity. Thus, in place of the sodium phenolate used as a reactant, there may be substituted an equivalent amount of potassium phenolate or lithium phenolate. The source of the phenolate employed as a reactant is not of importance, but the phenolate used should be substantially anhydrous in order that the desired product may be prepared in the highest yield. Various solvents may be substituted for the toluene shown in the example, provided that they are inert under the conditions of the reaction. Among such suitable alternate solvents are pentane, hexane, heptane, benzene, the xylenes, etc. To assist in the final purification of the phenyl chloroformate, it is desirable to use a solvent having a boiling point which deviates widely from that of the product. On the other hand, it is not necessary that either the phenolate or the phosgene be contained in any solvent, since the reaction may be effected using both reactants as such. In the example, a reaction temperature of about minus 10° C. was employed. The reaction temperature may be varied over a wide range with some effect upon the yield of the desired product; in general, reaction temperatures from about minus 35° to about plus 15° C. have been found to be most suitable. Preferably, 1.0–1.3 mols of phosgene per mol of phenolate are employed in effecting the reaction.

In conducting the method of the present invention, it is essential that the phenolate be added to the phosgene. Thus, using the same quantity of reagents and the same temperature of reaction, it has been found that when the order of the addition of the reagents is reversed (i. e., when the phosgene is added to the slurry of sodium phenolate) a yield of only 12.8 mols of phenyl chloroformate per 100 mols of the phenol used in making the phenolate is obtained.

I claim:

1. The method for the preparation of phenyl chloroformate which comprises adding to a solution of phosgene in at least one solvent selected from the group consisting of pentane, hexane, heptane, benzene, toluene and xylene, a slurry containing anhydrous sodium phenolate in at least one material selected from the group consisting of pentane, hexane, heptane, benzene, toluene and xylene and maintaining the temperature at a range from −35° C. to +15° C. for a length of time sufficient for the sodium phenolate to react with the phenyl chloroformate.

2. The method for the preparation of phenyl chloroformate as set forth in claim 1 in which said solvent and said material are toluene.

3. The method for the preparation of phenyl chloroformate as set forth in claim 1 in which the temperature is maintained at about −10° C.

4. The method for the preparation of phenyl chloroformate as set forth in claim 1 in which the molar ratio of phosgene to sodium phenolate is about 1.15 to 1.

5. The method for the preparation of phenyl chloroformate as set forth in claim 1 in which said solvent and said material are toluene, in which the temperature is maintained at about −10° C., and in which the molar ratio of phosgene to sodium phenolate is about 1.15 to 1.

JOHN A. S. HAMMOND.

REFERENCES CITED

The following references are of record in the file of this patent:

UNITED STATES PATENTS

| Number | Name | Date |
|---|---|---|
| 2,193,336 | Lecher et al. | Mar. 12, 1940 |

OTHER REFERENCES

Barral et al, "Bull. soc. chim. Paris," (3) vol. 21 (1899), pp. 722–727.

Auwers et al., "Ber. deutsch. chem. Ges," vol. 54 (1921), p. 1769.

Hoeflake, "Rec. trav. chim. des Pays-Bas," vol. 40 (1921), pp. 516–517.